Patented Feb. 25, 1941

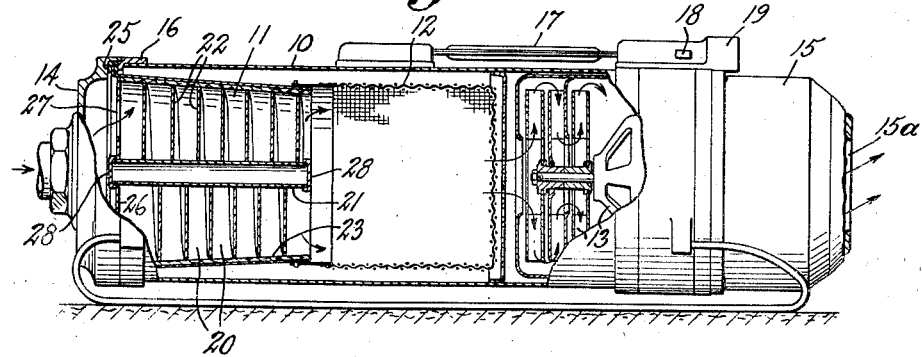
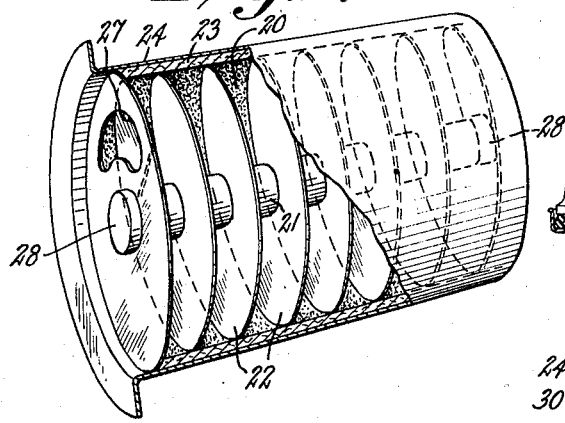
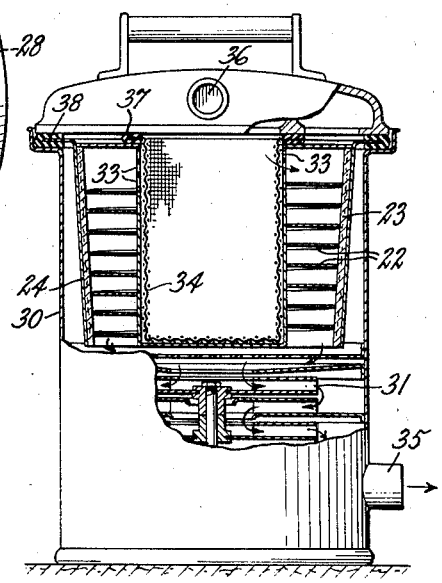
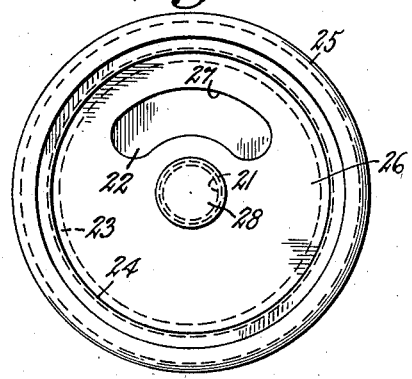

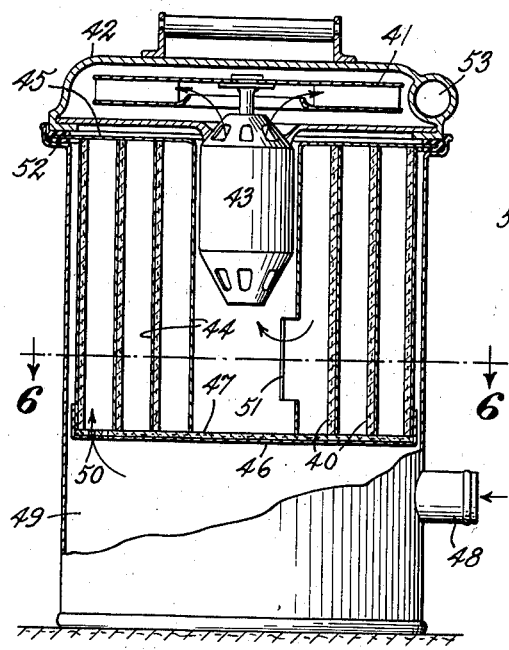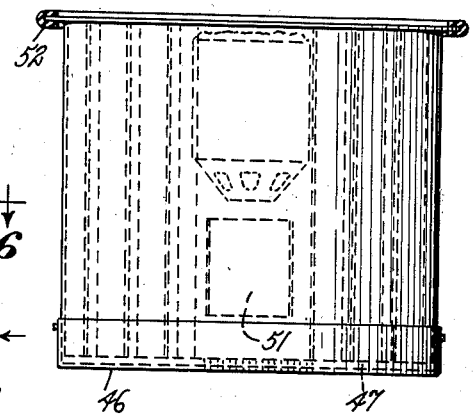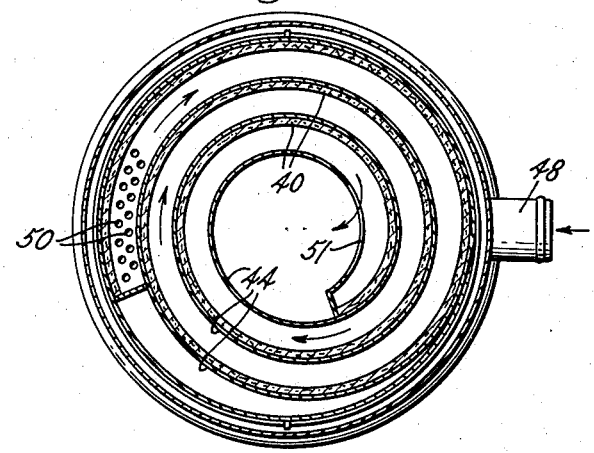

2,232,913

UNITED STATES PATENT OFFICE 2,232,913

VACUUM CLEANER

Josef Friedrich Heuberger, Stockholm, Sweden, assignor to Electrolux Corporation, Dover, Del., a corporation of Delaware Application September 30, 1937, Serial No. 166,490
In Germany October 3, 1936

8 Claims. (Cl. 183—67)

The subject matter of the invention is a new process and a new device for the separation of foreign substances such as dust from air and other gases. The invention was mainly evolved for household vacuum cleaners and large vacuum cleaners as, for instance, those used in hotels or in the industry, but the novel process described can also be applied in general. In particular, attention is called by way of introduction, to the fact that the invention can be applied also to the cleaning or purification of liquids. In connection with most vacuum cleaners placed on the market at the present time, the dust is collected in a dust filter, a dust bag or the like, through which the air from which the dust is to be removed is passed. Such dust bags and filters offer a very considerable resistance to the passage of the air, which resistance furthermore becomes the greater the more the walls are clogged with dust through which the air must pass. The reduction of this undesirable resistance to the passage of the air and also the undesirable variation of this resistance has met with little success heretofore.

The elimination of dust bags in general and the cleaning of the air by imparting a rotary motion in order to separate the dust from it by centrifugal force have been suggested. Such suggestions which have for their purpose the elimination of the air-permeable dust collecting bag up to the present time had not resulted in a practical apparatus which would assure a dependable operation. It has rather been shown that many of the devices of this kind suggested, even though the coarser dust could be separated by same, still made a subsequent use of a dust bag or the like advisable, in which the fine dust could collect and through which the air had to pass. These bags, however, in turn again have the aforementioned disadvantages of the ordinary dust bags namely, on the one hand, the unavoidable resistance which they offer to the passage of the air and, on the other hand, the undesirable variation of this resistance due to the gradual clogging of the wall of the bag with fine dust.

Furthermore, the dust bags, irrespective of whether they are used alone or in connection with other dust separating devices, frequently have the undesirable property that during the operation, i. e., during the passage of the air, they flutter which may result in the fine dust particles gradually working through the walls of the bag.

An object of my invention is to provide a way to eliminate the difficulties mentioned at the beginning hereof and to assure a dependable separation of the dust from the air.

Another object of my invention is to separate the dust by the use of centrifugal force.

A further object of my invention is the separation of the fine dust on dry adhering surfaces against which the impurities of the gases to be purified strike and the fine dust contained in the gases will adhere without the air passing through these surfaces. In this connection this separation of the fine dust, if desired, can be preceded or followed by a separation of the coarser particles. For the separation of the coarse particles from the dust however, a fine mesh dust bag which offers considerable resistance to the air passing through it, is not necessary. The surfaces to which the fine dust is caused to adhere preferably consists of fibrous material, such as cotton, flannel, felt, asbestos, cloth or paper. Card-like members such as brushes made of any desired material including even metal can also be used. The latter is especially advantageous if it is desired to clean liquids as well as gases. Although by the invention, the fine dust is deposited along a long path, it can be arranged so that the adhering surface occupies a limited axial length. In order to prevent the air from passing through the adhering surface, it can be made compact or provided with a suitable air impermeable backing which prevents the passage of the air through the adhering surface.

The drawings show the subject matter of the invention in a few embodiments given by way of example.

Fig. 1 shows a household vacuum cleaner partly in section, provided with a dust separator in accordance with the invention;

Fig. 2 shows in perspective view and on a larger scale the device for the separation of the fine dust;

Fig. 3 shows a front view of this device;

Figs. 4 and 5 show further embodiments of the invention in its application to vertical vacuum cleaners;

Fig. 6 shows a section along the line 6—6 of Fig. 5, and

Fig. 7 shows a lateral view of the dust separating device of Fig. 5.

The vacuum cleaner shown in Fig. 1 consists of an outer jacket 10, which surrounds a device 11 for separating fine dust, a collector 12 for coarser dust particles and a motor fan unit 13. The cylindrical jacket 10 is closed on both ends by means of caps 14 and 15, which contain air admission and air discharge openings. The front cap 14 rests against the ring 16, which is placed around the front part of the housing 10. In connection with the embodiment under consideration here, the housing is provided on top with a handle 17, a switch 18 and a connector 19.

The dust separating device 11, for the fine dust, in connection with embodiment under consideration here, given by way of example, as can be especially noted from Fig. 2, consists of a helically wound air channel 20 which is formed by a strip 22 which is wound helically around a center shaft 21 which may possibly be hollow, around the circumference of which strip there is placed a dust adhering surface 23 made of any of the aforementioned substances. This adhering surface, the diameter of which preferably tapers in the direction of the passage of the air, is enclosed by a sleeve 24 (Fig. 2), with a front flange shaped edge which can be placed in a packing 25 made of rubber or the like between the parts 14 and 16. The conical dust adhering surface 23 can be covered in front by means of a special disc 26, in which there are provided one or several openings 27 for the admission of the gases from which the dust is to be removed. The center shaft 21 consists suitably of a tube, the ends of which are closed by caps 28 in order to prevent uncleaned air from passing through this pipe or from dust collecting therein. The front closing disc 26 can be combined in a suitable manner with the front closing cap 28.

In connection with the embodiment given by way of example, shown in Fig. 1, there is inserted behind the dust separator 11 for the fine dust, described above, a collecting device 12 for coarser dust particles which can be connected with the separator 11 and which can consist of wire gauze or of any other material which offers no resistance at all or no appreciable resistance to the passage of the air.

The device operates as follows:

The dust-laden air drawn in by the fan into the dust separating device in the direction of the arrow of Fig. 1 has imparted to it a rotary motion in the channel formed by the plate 22, whereby the dust contained in same is thrown against the adhering surface 23, on which the fine dust particles collect, while any possible coarser dust particles are moved further until they are collected in the collector 12. The air cleaned in this manner enters, without encountering any appreciable resistance, through the walls of this collector into the fan, by which it is fed past the motor, or entirely or partly through the motor, to the discharge opening in the cap 15a, from where it escapes into the open air. It can be noted that in connection with this manner of dust separation, in accordance with which the fine dust is retained on dry adhering surfaces, without the air passing through these surfaces, the drawbacks mentioned at the beginning hereof are completely eliminated. It may also be mentioned here that experiments which have been made with this novel dust separation process, have already shown excellent results. The adhering surface 23 must, of course, be cleaned from time to time or be replaced by a new filter, which, however, can be done in a very simple manner and which does not cause any great expense. The resistance offered by the dust collecting receptacle 12 to the air passing through same remains practically constant, as a result the suction power of the apparatus also remains constant.

The device shown in Fig. 4 shows an embodiment by way of example, of the invention in connection with a vertical, so-called pot type vacuum cleaner. The vacuum cleaner consists of a cylindrical sleeve 30, in the lower part of which is the motor blower unit 31, and the upper part of which surrounds the dust separating device proper. In principle, the separation of the dust takes place here as in the case of the first embodiment given by way of example. However, an essential difference consists in that the coarse dust is separated from the air before it reaches the adhering surface for the fine dust. This, in the case of the embodiment in accordance with Fig. 4, is achieved by the location of the helical plate 22 around a cylindrical receptacle 32 closed at the bottom, the upper part of which is provided with small openings 33, through which the fine dust can enter the helical passageway, while the coarser dust deposits in the receptacle 32. It is advisable to provide in the receptacle 32 an air permeable material 34, by means of which the coarse dust collected therein can easily be removed from the apparatus. Also, there can be used for this purpose an air impermeable receptacle, which, however, must be provided at the top with fine openings, through which the air laden with fine dust can pass. The fine dust which has passed through the upper wall of the material 34 and through the upper opening 33 of the receptacle 32, in the case of the first embodiment given by way of example, is thrown in the channels formed by the helical plate 22 by centrifugal force against the adhering surface 23 surrounding the screw, to which it adheres. This adhering wall can again, as in Fig. 1, be backed by a sleeve 24 which may consist of metal, which prevents the passage of the air through the adhering surface. After its discharge from the fine dust separating device, the cleaned air enters the fan, whereupon it passes by or through the motor, discharging into the open air, through the connection 35, arranged at the lower part of the receptacle 30. The entrance of the dust-laden air into the apparatus, in connection with the embodiment shown by way of example in Fig. 4 is through the opening 36 arranged in the cover of same. The removable collector 34 for the coarse dust can be provided on top like the covering or sleeve 24 of the adhering surface 23 with a flange 37 or 38 which can be arranged in rubber packings, and which in turn rests against the cover of the apparatus.

The dust separating device shown in Figs. 5–7, which also is devised for a pot type vacuum cleaner, but which of course, like that of Fig. 4 can be also used in vacuum cleaners of horizontal construction, differs from the device shown in Fig. 4 on the one hand by a special development of the adhering surface, to which the fine dust is retained. This adhering surface 40 in connection with the embodiment in accordance with Figs. 5–7 is developed as a spiral surface of comparatively great height, so that the air laden with fine dust during its whirling motion is forced to move toward the axis of the apparatus. Furthermore, in connection with this embodiment, the fan 41 is placed in the cover part 42 of the vacuum cleaner while the motor 43 extends into a central sleeve 44 which may form the continuation of the outer covering of the adhering surface 43 (Fig. 6). The space occupied by the adhering surface 40 and its covering 44 is covered on top and on bottom by discs 45 and 46 respectively. The upper covering disc 45 is provided with an outside flange which is placed in a packing 52 which in turn is arranged between the outer receptacle of the apparatus and its cover. The edge of the lower disc 46 is bent up so that there is provided an insert for the spiral 40 and in this insert there can be placed a packing disc 47 which is developed so that it can be removed very easily. The device is preferably arranged so that the spiral can easily be removed from the cover part 46. Near the edge of the lower disc 46 and in the packing disc 47 fine openings 50 are provided which make it possible for the air laden with fine dust to enter, from below, the intermediate space between the outermost spiral windings. The air to be cleaned in this embodiment given by way of example is drawn into the apparatus through the connection 48 arranged in the outer apparatus wall. The coarser dust particles deposit in the lower chamber 49 of the apparatus whereupon the air still laden with fine dust particles passes through the fine openings 50 arranged on the outside into the spiral (in the direction of the arrow) in which the fine dust, on account of the centrifugal action, is thrown against the adhering surface at which it is retained. After the air has followed the path through the spiral air channels it finally reaches, through an opening 51 in the part of the spiral wall nearest the apparatus axis, the center cylinder of the apparatus and then passes, as indicated by the arrows, through the motor arranged in same in order to finally leave the apparatus through the cover opening 53. In order to empty the apparatus, the cover together with the motor can be removed whereupon the adhering surface on which the fine dust has collected, can be removed without any difficulty and cleaned or replaced; at the same time also the coarse dust which has collected on the bottom of the receptacle can be discharged. Also here of course a special collector for the coarse impurities can be provided which can be arranged so that it can be pulled laterally out of the apparatus without it being necessary to first remove the cover and the adhering surface for the fine dust. The idea of the invention is not restricted to the embodiments given by way of example and shown in the drawings but can be utilized in many different manners in practical operation. If only the separation of fine dust is necessary, devices for the collecting of coarse dust particles can be dispensed with. As can be noted from Figs. 1 and 4, the fine dust is deposited therealong a comparatively very long path although the developed surface has a practically square form. As most of the fine dust particles are deposited during the first part of their path and as the adhering surface therefore is more important at the place of entrance than at the place of the discharge of the air, the adhering surface may be sub-divided so that the front part can be replaced more frequently.

Attention has been called above to the fact that the invention can also be used for the cleaning of liquids. Thus, for instance, oil circulating in transformers or the like can be cleaned in accordance with the invention. In this connection, the adhering surfaces which in themselves are dry, are wetted by the liquid to be purified.

What I claim is:

1. In a vacuum cleaner, a housing having an inlet opening, a substantially cylindrical container adjacent said inlet opening, a covering of fibrous material for the inner wall of said container, a helically wound strip located in said container, and means to cause the air passing through said container to travel along said helical strip whereby the fine dust particles are deposited on said fibrous material by centrifugal force.

2. In a vacuum cleaner, a housing having an inlet opening, a substantially cylindrical container adjacent said opening tapering away from said opening, a cover of fibrous material for the inner wall of said container, directing vanes for imparting a centrifugal motion to the air passing through said container, a permeable material located in the path of air flowing from the opening of said container opposite from said inlet opening, and means to produce a flow of air through said container whereby the fine dust particles are deposited on said fibrous material by centrifugal action and coarse dust particles are separated by said permeable material.

3. In a vaccum cleaner, a housing having an inlet opening, a container adjacent said opening in the form of a frustum of a cone, a fibrous material covering the inside wall of said container, a bag of permeable material covering the opening in the end of said container opposite from said inlet opening, said housing having an outlet opening, and means to pass the air through said container with a rotary motion whereby fine dust particles are deposited on said fibrous material.

4. In a vacuum cleaner, a housing having an inlet opening, a container adjacent said inlet opening decreasing in diameter away from said opening, a metal strip wound helically within said container, a fibrous material covering the wall of said container, and means to cause air to flow through said container in a channel formed by said metal strips whereby fine dust particles are deposited by centrifugal action on said fibrous material.

5. In a vacuum cleaner, a housing having an inlet opening, means for separating coarse dust particles from air entering said inlet opening, a container having a helical channel, fibrous material covering the walls of said container, and means to cause air to flow through said container whereby coarse dust particles are separated by said first-named means and fine dust particles are deposited on the fibrous material.

6. A vacuum cleaner comprising a housing having an inlet opening and an outlet opening, means to produce a flow of air through the housing from the inlet opening to the outlet opening, a container located in said housing having an impermeable wall, a covering of fibrous material for said wall, and means to direct the air in contact with the surface of said material to cause the fine dust particles to adhere to said material and separate from the air in passing through the housing.

7. A vacuum cleaner comprising a housing having an inlet opening and an outlet opening, means to produce a flow of air through the housing from the inlet opening to the outlet opening, a container located in said housing having an impermeable wall, a covering of fibrous material for said wall, means to direct the air in contact with the surface of said material to cause the fine dust particles to adhere to said material and separate from the air in passing through the housing, and means to separate dust particles from the air not deposited on said material.

8. A vacuum cleaner comprising a housing having an inlet opening and an outlet opening, means to produce a flow of air through the housing from the inlet opening to the outlet opening, a container of impermeable material, a covering of permeable material for said container having a fluffy surface, and means for imparting a rotary motion to the air passing through said container to cause said air to impinge against said permeable material, whereby fine dust particles are deposited on said permeable material.

JOSEF FRIEDRICH HEUBERGER.